Figure 1:
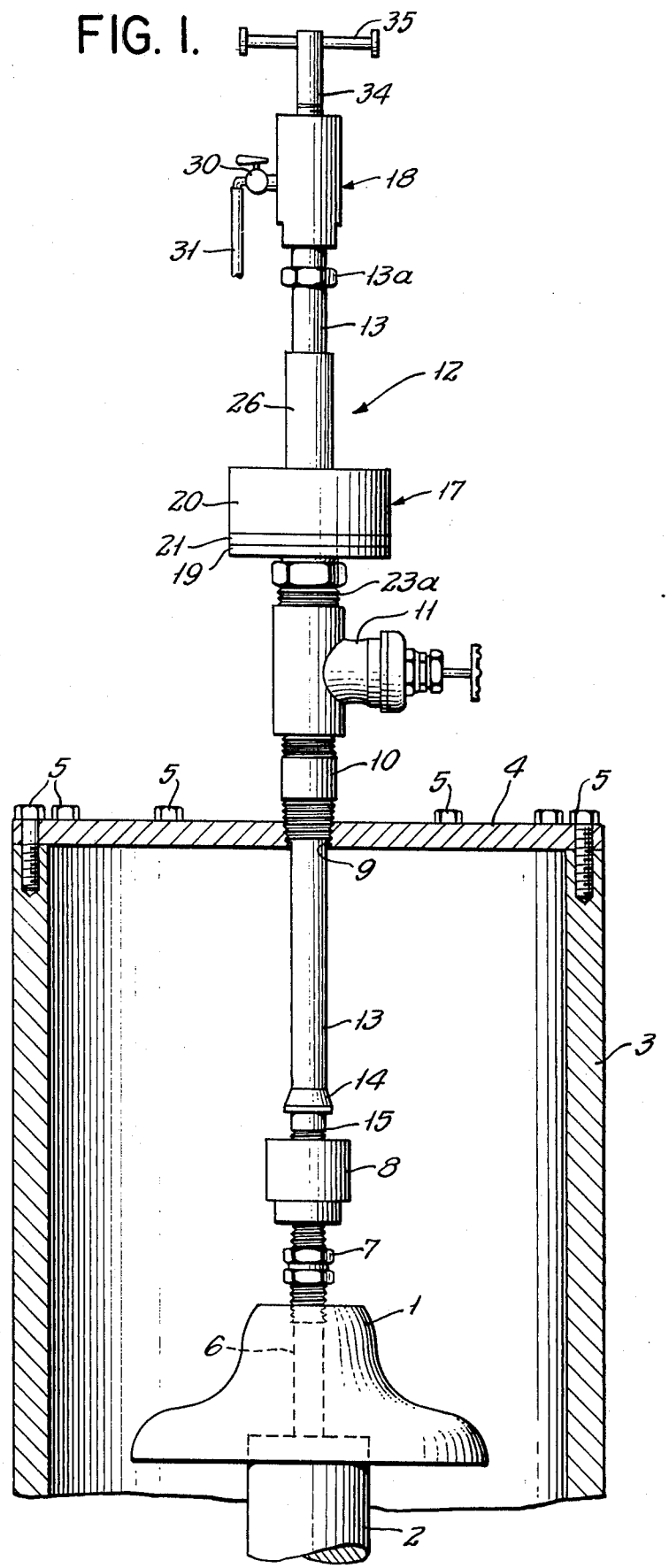

United States Patent [19]
Terreri

[11] 4,273,951
[45] Jun. 16, 1981

[54] OIL-FILLED CABLE POTHEAD WITH VENTING MEANS AND TOOL THEREFOR

[76] Inventor: Anthony N. Terreri, 340 Hillside Ave., Livingston, N.J. 07039

[21] Appl. No.: 82,966

[22] Filed: Oct. 9, 1979

[51] Int. Cl.³ .......................................... H02G 15/22
[52] U.S. Cl. ........................ 174/11 BH; 137/320; 174/19; 251/128; 251/291
[58] Field of Search ............ 174/8, 10, 11 R, 11 BH, 174/17 VA, 19, 20, 22 R; 137/281, 283–287, 289, 291, 293, 317, 319–323; 251/128, 291

[56] References Cited

U.S. PATENT DOCUMENTS

| | | | |
|---|---|---|---|
| 315,652 | 4/1885 | Moss | 137/286 |
| 706,884 | 8/1902 | Beebe | 137/320 X |
| 915,422 | 3/1909 | Ewart | 137/286 |
| 1,683,489 | 9/1928 | Rice | 137/317 X |
| 1,919,935 | 7/1933 | Eby | 174/20 |
| 2,187,838 | 1/1940 | Penick et al. | 137/319 X |
| 2,299,814 | 10/1942 | Gale et al. | 137/320 |

FOREIGN PATENT DOCUMENTS

| | | | |
|---|---|---|---|
| 25967 | 1/1931 | Australia | 174/11 BH |
| 361417 | 10/1922 | Fed. Rep. of Germany | 137/320 |

*Primary Examiner*—Laramie E. Askin
*Attorney, Agent, or Firm*—Brooks, Haidt, Haffner & Delahunty

[57] ABSTRACT

A conventional pothead-tank combination for an oil-filled electric cable is modified to replace the usual manually operable venting valve within the tank and on the pothead by a relief valve installed to close under pressure of the oil and is further modified to add a manually operable gate valve on the tank wall with the valve passageway aligned with the relief valve. A venting tool is provided, which comprises a swivel mounting unit which may be secured to the gate valve, a venting tube which is slidably mounted on the mounting unit and which has an inner end which may be secured to the relief valve, a housing having a cavity and secured to the other end of the venting tube and having a sampling valve thereon, and a valve opening rod extending from exteriorly of said housing through the interior of the tube to the end thereof remote from the housing, said rod being movable longitudinally for engaging and opening the control member of the relief valve and thereby venting fluids including accumulated gases from the pothead.

18 Claims, 2 Drawing Figures

OIL-FILLED CABLE POTHEAD WITH VENTING MEANS AND TOOL THEREFOR

This invention relates to a tool for venting oil and gases from the end of an electric power cable which is received within a gas filled tank, and to the connectors which are used therewith.

To terminate an oil filled cable with a pothead having a venting valve and to surround such pothead with a tank containing an insulating gas, such as sulfur hexafluoride, is a relatively new state of the art. The oil within the cable usually is subjected to a pressure of about 200 p.s.i.g. and the insulating gas may be at a pressure of about 30 p.s.i.g. The tank usually has a lid or cover bolted thereto by several bolts.

On occasions, it is necessary to vent accumulated gases from the cable and/or take samples of the oil. In order to obtain access to the venting valve of the pothead, the gas must be removed from the enclosure and the bolted cover removed. Following the venting operation the enclosure must be thoroughly cleaned, dried, sealed, leak checked, evacuated, refilled to the proper gas pressure and moisture tested. This involves a considerable amount of time and equipment which delays restoring the feeder to service. Further, inclement weather would hamper these activities.

One object of the invention is to permit the venting of the cable at the pothead without the need for removing the insulating gas and opening the tank.

Another object of the invention is to permit the cable to be vented and the obtaining of oil samples quickly and easily without requiring major modifications of existing pothead-tank installations.

In accordance with the preferred embodiment of the invention, the manual venting valve normally present on the pothead is replaced by a relief valve installed in a direction such that the oil in the cable closes, rather than opens, the relief valve and so that the relief valve may be opened by an instrument inserted therein from externally of the pothead. A threaded hole or a welded coupling is provided in the gas tank cover in line with the relief valve, and a manually operable gate valve is installed on the cover using a nipple screwed into the hole. The relief valve and the gate valve remain permanently installed.

The preferred embodiment of the invention also includes a special tool to be used with the modified pothead-tank installation to take samples of, or vent, the oil and gas in the cable. The tool comprises a vent tube which will fit through the gate valve and connect to the relief valve, and which is slidably received in a swivel mounting unit which may be connected to the open side of the gate valve. The outer end of the vent tube carries a housing which has a sampling valve thereon and which has a threaded wall hole aligned with the bore of the vent tube for receiving the threaded end of a rod which fits within the vent tube and which has a length sufficient to cause it to engage and open the relief valve when it is turned into the threaded wall hole by a sufficient amount. Thus, when the vent tube is connected to the relief valve and the rod is turned until it opens the relief valve, gases and oil will flow from the pothead into the housing where they may be removed by way of the sampling valve. After the samples are taken and the gases have been vented, the vent tube is removed and the gate valve is closed. It will be noted that such venting and sampling does not require removal of the tank cover and the gas therein, and does not expose the interior of the pothead as would otherwise permit the gases and oil in the cable to enter the tank.

Figure 2:
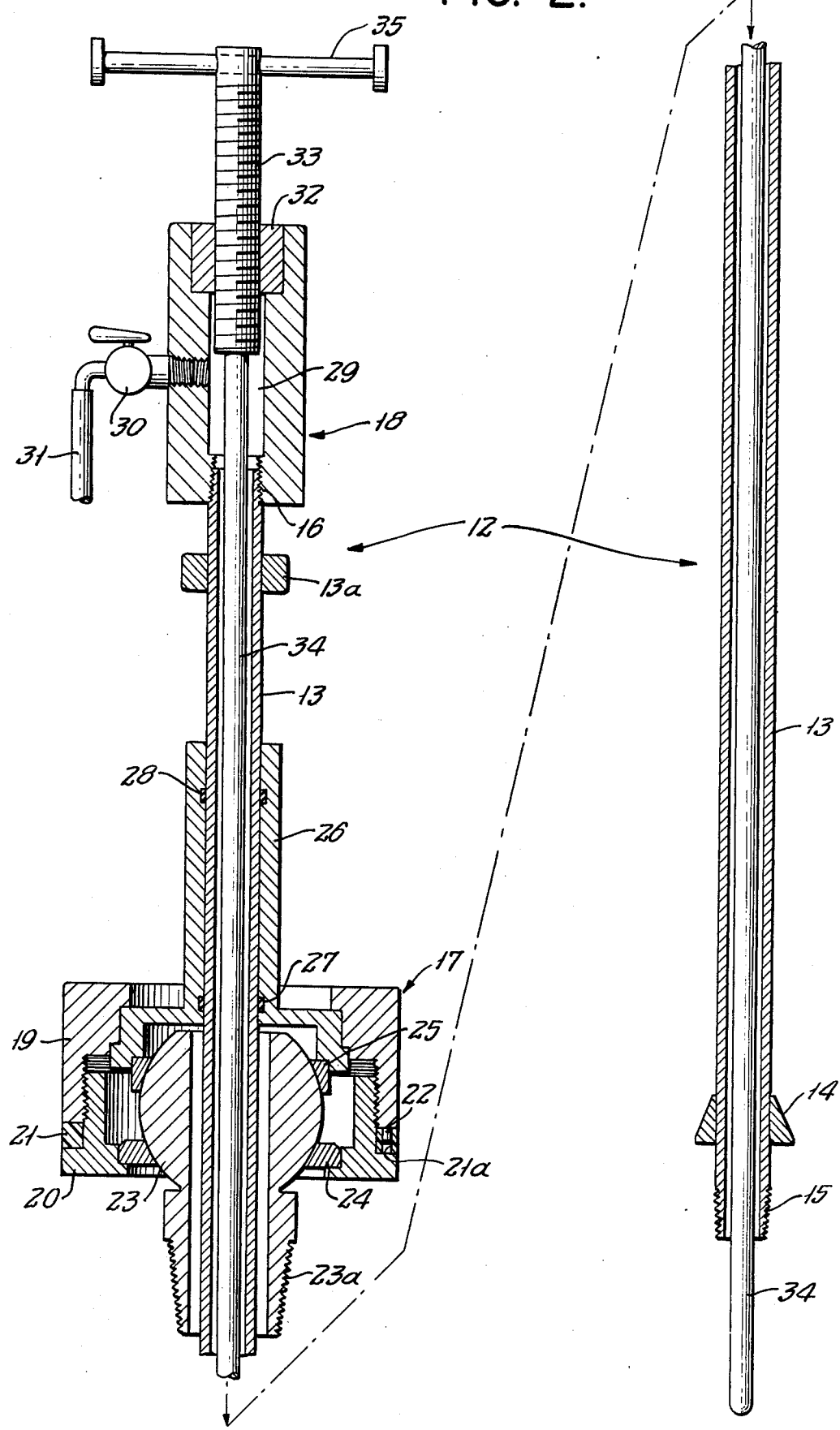

Other objects and advantages of the present invention will be apparent from the following detailed description of the presently preferred embodiments thereof, which description should be considered in conjunction with the accompanying drawings in which:

FIG. 1 is an elevation view, partly in section, showing the venting tool of the invention mounted on a pothead-gas tank installation which has been modified in accordance with the invention; and FIG. 2 is an enlarged, longitudinal sectional view of the venting tool of the invention.

FIG. 1 illustrates diagrammatically, a conventional pothead 1 for an oil-filled, high voltage, electrical power cable 2. The pothead 1 is within a gas tight tank 3 which has a conventional gas tight connection (not shown) with the cable 2. The upper end of the tank 3 is closed by a cover 4 secured thereto by bolts 5.

The pothead 1 normally has a channel 6 which has a threaded wall at its upper end which normally receives a manually operable venting valve (not shown). The channel 6 communicates with the interior of the pothead 1 so that oil and gases within the cable 2 flow to the upper end of the channel 6. To vent oil and gases from the cable 2, the past practice has been to remove the cover 4, thereby allowing the gas to escape from the tank 3, connect a conduit, such as a flexible tube, to the manually operable venting valve at the upper end of the channel 6 and, then, to open the venting valve. The procedure obviously requires a substantial amount of time and labor and the loss of the gas in the tank 3.

In accordance with one aspect of the invention, the manually operable venting valve at the upper end of the channel 6 is replaced by a valve 7 which is of the pressure-relief type, but installed in a reverse direction. Such a valve has a control member and is normally installed so that when the fluid pressure at one end thereof increases above a preset value, the control member will open the valve until the pressure decreases to the preset value. The control member is also operable to open the valve by an instrument or tool inserted into the end thereof which receives the fluid which will open the valve. On the other hand, when the valve is subjected to fluid pressure at the opposite end thereof which is greater than the pressure at the first-mentioned end thereof, the control member will not open the valve. One such valve is a type No. 8 CPA 2-3 stainless steel, adjustable relief valve sold by the Nupro Company, 15635 Saranac Rd., Cleveland, Ohio.

In contrast to the usual installation of such a relief valve, the valve 7 is installed in a direction such that the fluids in the pothead 1, and hence in the channel 6, act to close, rather than open, the control member of the valve 7 and such that a tool or instrument inserted into the upper end of the valve 7 (as viewed in FIG. 1) will cause the control member of the valve 7 to open and permit fluids to escape from the channel 6.

Since the valve 7 normally has male ends, a transition coupling 8 is secured to the upper end of the valve 7. Of course, if the upper end of the valve 7 is a female end, the coupling 8 may be omitted, provided proper means are supplied to facilitate alignment with the threaded end 15 of the tube 13 hereinafter described.

Normally the tank cover 4 is imperforate except for the holes required for the passage of the bolts 5. In accordance with a further aspect of the invention, a hole 9, having a threaded wall, is formed in the cover 4, the axis of the hole 9 being substantially co-axial with the axis of the coupling 8. By means of a nipple 10, a manually operable valve 11 is mounted on the cover 4. The valve 11 is one which when the valve 11 is opened, has a through passageway which permits a vent tube, hereinafter described, to pass through the valve 11. Such valve 11 may, for example, be a gate valve.

The modifications of the pothead-tank installation hereinbefore described, namely, the replacement of the usual, manually operable, venting valve by the relief valve 7, the addition of the transition coupling 8 and the installation of the nipple 10 and the valve 11, need be made only one time to permit the use of the venting tool described hereinafter. Thus, while modification of the pothead-tank requires removal of the cover 4, replacement of the manually operable venting valve by the relief valve 7 and the coupling 8 and mounting of the nipple 10 and the valve 11 on the cover 4, such operations are not required when it is desired to vent the fluids from the cable 2 one or more times after the modification is made.

Another aspect of the invention is a venting tool 12 specifically invented for use with the modified pothead-tank installation. With reference to FIGS. 1 and 2, the venting tool 12 comprises a stainless steel venting tube 13 with a stop collar 14 secured in fixed relation thereto and with threaded ends 15 and 16. The external diameter of the stop collar 14 is less than the diameter of the bore of the nipple 10 and the passageway in the valve 11 when the latter is open. Also the external diameter of the tube 13 is less than the through passageway in a swivel mounting unit 17 so that the tube 13 may be slid longitudinally with respect thereto. Preferably, the outside diameter of the tube 13 is sufficiently smaller than the bore of the nipple 10 and the passageway in the valve 11 to permit tilting of the tube 13 for alignment thereof with the axis of the coupling 8. For example, the diameter of the tube 13 may be about one-half inch and the bore of the nipple 10 and the diameter of the passageway in the valve 11 may be about fifteen-sixteenths or larger. The threaded end 15 fits into a corresponding hole with a threaded wall in the upper end of the transition coupling 8, and the threaded end 16 engages the threads in a wall of a sampling housing 18. The tube 13 is rotatable by means of a non-circular, e.g. a hexagonal, nut 13a secured to the tube 13.

The swivel mounting unit 17 is provided to permit transverse movement, and thereby to facilitate alignment, of the threaded end 15 of the tube 13 with the mating end of the transition coupling 8, but such unit 17, while preferred, may not be necessary. Also, other types of mounting units which will facilitate alignment of the end 15 with the coupling 8 may be used. The swivel unit 17 comprises a pair of interengaging, threaded rings 19 and 20 having a resilient gasket 21, e.g. made of neoprene, therebetween. The ring 19 has a pin 22 secured thereto and extending axially thereof for limiting relative rotation of the rings 19 and 20, the gasket 21 having a circumferentially extending slot 21a therein for receiving the pin 22. The circumferential length of the slot is small compared to the circumferential length of the gasket 21, and the end walls of the slot limit the relative rotation of the rings 19 and 20 so as to prevent complete separation of the rings 19 and 20 but so as to permit the tube 13 to be tilted to various positions.

The swivel unit 17 also comprises a combined aligning ball 23 and pipe fitting 23a and a pair of ball retainers 24 and 25. When the rings 19 and 20 are brought close enough together, the ball 22 and the remainder of the unit 17 are held in fixed positions, relative to each other, and when the rings 19 and 20 are separated by a sufficient distance, the rings 19 and 20, and hence, the tube 13 are permitted to move relative to the axis of the ball 23 and fitting 23a thereby permitting tilting of the tube 13 relative to the axis of the fitting 23a. Such tilting of the tube 13 permits movement of the end 15 transversely of the length of the tube 13 and thereby facilitates alignment of the end 15 with the opening in the coupling 8. Thus, by loosening the rings 19 and 20 after the fitting 23a has been turned into the upper end of the valve 11, the lower end 15 of the tube 13 may be moved sidewise with respect to the opening in the coupling 8 and by a limited amount to permit the end 15 to be threaded into the upper end of the transition coupling 8.

The swivel unit 17 also comprises a tube support 26 having a pair of O-rings 27 and 28 at the interior thereof which provide a sliding, gas-tight fit between the support 26 and the tube 13.

The sampling housing 18 has a cavity 29 in fluid communication with the bore of the venting tube 13, and fluids may be removed from the cavity 29, for testing, or mere venting purposes, by way of a manually operable valve 30 and a tube 31. The upper end of the cavity 29 is closed by a plug or bushing 32 having a threaded bore which mates with the threads 33 at the upper end of a release rod 34 having a manually engageable handle 35. Accordingly, when the rod 34 is rotated by means of the handle 35, the rod 34 moves axially in a direction dependent upon the direction of rotation of the rod 34. With sufficient rotation in the proper direction the rod 34 may be completely removed from the remaining parts of the tool 12.

The lower end of the rod 34 extends to adjacent the control member of the relief valve 7 when the threaded end 33 of the rod 34 is initially threaded into the bushing 32. With continued rotation of the rod 34 in the same direction, the lower end of the rod 34 will engage the control member of the relief valve 7 thereby opening the valve 7 and permitting fluids in the channel 6 to flow interiorly of the venting tube 13 to the cavity 29 from which the fluids may be removed by way of the valve 30.

The tool 12 of the invention is used for venting and testing purposes in connection with a pothead-tank combination, modified as described hereinbefore, in the following manner:

(1) The rod 34 is adjusted by rotating it until it is in its uppermost position but with the threaded end 33 in gas tight engagement with the bushing 32. The tube 13 is moved axially with respect to the swivel unit 17 until the end 15 of the tube 13 and the end of the rod 34 are retracted sufficiently to permit the fitting 23a to be screwed into the upper end of the valve 11. Such movement of the tube 13 is limited by engagement of the collar 14 with the lower end of the support 26.

(2) The fitting 23a is screwed into the upper end of the valve 11, and the rings 19 and 20 are loosened.

(3) The valve 11 is opened and the tube 13 is moved downwardly through the valve passageway until the end 15 of the tube 13 is received in the upper end of the coupling 8, at which time the end 15 is screwed into the coupling 8 by turning force exerted on the nut 13a and the rings 19 and 20 are tightened. During this procedure a small, insignificant amount of gas in the tank 3 may flow through the tube 13 and into the cavity 29.

(4) The rod 34 is rotated in a direction which causes it to move axially toward the valve 7, until it engages the control member of the valve 7 and opens the valve 7. Gas and other fluids in the channel 6 will then flow up the inside of the tube 13 to the cavity 29 where they may be removed by way of the valve 30 for testing or venting purposes.

(5) After such testing and/or venting, the rod 34 is rotated in a direction which disengages it from the control member of the valve 7, thereby closing the valve 7. Rotation is continued until the rod 34 is completely removed from the tool 12.

(6) With the rod 34 removed, the interior of the tube 13 is then cleaned to avoid dripping of oil into the tank 3 when the tube 13 is removed. Such cleaning may be accomplished by siphoning the oil out of the tube 13 and the use of swabs.

(7) The rod 34 is cleaned and reinserted within the tube 13 so as to close the upper end of the cavity 29, but it is not reinserted far enough to again open the valve 7.

(8) The end 15 of the tube 13 is unscrewed from the transition coupling 8 and is withdrawn, the rod 34 moving with the tube 13, until the valve 11 can be closed.

(9) After valve 11 is closed, the tool 12 is removed by unscrewing the fitting 23a from the upper end of the valve 11.

The O-rings 27 and 28 prevent gas within the tank 3 from leaking to the atmosphere during the use of the tool 12, and it will be observed that during the use of the tool 12 to remove fluids from the channel 6, such fluids are confined to the interior of the venting tube 13 and are thereby prevented from entering the interior of the tank 3.

During the use of the tool 12, the cable 2 is not, of course, electrically energized, but because of the speed with which the tool may be used for venting and testing purposes, the shut-down time is relatively short.

The tool 12 may also be used for purposes other than the venting or removal of fluids from the channel 6. For example, if the exterior of the venting tube 13 is covered with electrical insulation, except at the end 15, or if an insulated rod is substituted for the venting tube 13 and the rod 34, the tool 12 may be used to provide an electrical connection to the cable 2, the channel 6 normally having a conductive wall which is conductively connected to the center conductor of the cable 2. Such a connection has uses for electrical tracing, identifying, etc.

Although preferred embodiments of the present invention have been described and illustrated, it will be apparent to those skilled in the art that various modifications may be made without departing from the principles of the invention.

What is claimed is:

1. In combination, a pothead having a first valve secured thereto and being itself secured to the end of an oil filled cable with the oil under pressure, means providing a channel interconnecting said first valve with said cable whereby oil of said cable flows to said valve, said valve having a manually operable control member and said valve being connected to said channel so that said control member is urged to its closed position when oil pressure within said cable is applied thereto, a gas tight tank enclosing said pothead, a manually operable, second valve with a through passageway, said second valve being mounted on said tank with said passageway aligned with said first valve, a mounting unit secured to the end of said second valve opposite to the end thereof nearer said tank, a venting tube extending from said first valve through said passageway and through said mounting unit, a sampling housing secured to the end of said venting tube remote from said first valve whereby fluids passing through said first valve are directed to the interior of said sampling housing by said venting tube, said sampling housing having a hole therein aligned with the bore of said venting tube, and a rod in said hole and extending from said hole through said venting tube to at least adjacent said first valve, said first valve control member being operable by said rod with movement of said rod toward said first valve.

2. The combination as set forth in claim 1 wherein said first valve is a relief valve, wherein said second valve is a gate valve, wherein said venting tube is slidable longitudinally with respect to said mounting unit and said gate valve and wherein said mounting unit has means providing a fluid tight seal between said venting tube and said mounting unit.

3. The combination as set forth in claim 1 or 2 wherein said hole in said sampling housing has a threaded wall and said rod has threads thereon which mate with the threads on the wall of said hole.

4. The combination as set forth in claim 1 or 2 wherein said sampling housing has a cavity in fluid communication with the interior of said venting tube and has a manually operable third valve thereon in fluid communication with said cavity.

5. The combination as set forth in claim 1 or 2 wherein said mounting unit comprises a swivel unit which permits movement of said venting tube transversely to the length thereof.

6. An oil filled cable termination comprising a pothead secured to the end of said cable, said pothead having a channel communicating with said cable and extending to the exterior of said pothead for conveying oil from said cable, a first valve connected to said channel, said first valve having a manually operable control member and said first valve being connected to said channel so that said control member is urged to its closed position by oil in said channel, a gas tight tank surrounding said pothead, and a manually operable valve with a through passageway, said last-mentioned valve being mounted on a wall of said tank opposite to and spaced from said first valve, but with its said passageway aligned with said first valve to permit operation of said control member and opening of said first valve through said passageway.

7. An oil filled cable termination as set forth in claim 6 wherein said first valve is a relief valve.

8. In combination, a gas tight enclosure having a wall with a through passageway which may be opened and closed, a fluid controlling valve within the interior of said enclosure, said valve having a body with an outlet and having a manually operable member within the body for opening and closing the valve to thereby control the flow of fluid out of said outlet, and said valve being mounted in a fixed position within said gas tight enclosure with said body spaced from the interior surface of said wall of said gas tight enclosure and spaced from said through passageway, and a tool providing a connection with said fluid controlling valve, said tool comprising:

a mounting unit secured in fluid-tight relation to said enclosure at the exterior end of said passageway; and a relatively long and narrow member in fluid-tight relation with respect to said mounting unit but movable longitudinally with respect to said mounting unit, said relatively long and narrow member having one end extending from one side of said mounting unit and having a length between said one end thereof and its opposite end which is substantially greater than the length of the mounting unit longitudinally of said relatively long and narrow member, said relatively long and narrow member extending from said outlet and said operating member of said valve to the side of said mounting unit remote from said valve and said relatively long and narrow member having a longitudinal fluid passageway therein extending from said one end thereof to adjacent the opposite end thereof whereby said relatively long and narrow member may be inserted into the interior of said gas tight enclosure through the passageway in the wall of the gas tight enclosure and into engagement with said valve body with said one end thereof at said outlet and into engagement with said manually operable member of said valve to cause fluid to flow from said outlet to the exterior of said gas tight enclosure by way of the longitudinal fluid passageway in said relatively long and narrow member.

9. The combination as set forth in claim 8 wherein said relatively long and narrow member comprises a tube having means at one end thereof for securing it to said valve and having means at the other end thereof for closing said other end of said tube.

10. The combination as set forth in claim 9 wherein said means for closing said other end of said tube comprises a housing secured to said other end of said tube, said housing having a cavity in fluid communication with the interior of said tube.

11. The combination as set forth in claim 10 further comprising a manually operable valve on said housing in fluid communication with said cavity.

12. A tool for providing a connection with a valve within a gas tight enclosure, said enclosure having a through passageway which may be opened and closed, said tool comprising:
 a mounting unit adapted to be secured to said enclosure at the exterior end of said passageway;
 a relatively long and narrow tube in fluid-tight engagement with said mounting unit but movable longitudinally with respect to said mounting unit, said tube having a length sufficient to extend from said valve to the side of said mounting unit remote from said valve, said tube having means at one end thereof for securing it to said valve and having means at the other end thereof for closing said other end of said tube, said means for closing said other end of said tube comprising a housing secured to said other end of said tube, said housing having a cavity in fluid communication with the interior of said tube; and
 a rod extending through said housing and into said tube, said rod being movable lengthwise with respect to said housing and said tube and having a length sufficient to extend from said housing to at least said one end of said tube.

13. A tool for providing a connection with a valve within a gas tight enclosure, said enclosure having a through passageway which may be opened and closed, said tool comprising:
 a mounting unit adapted to be secured to said enclosure at the exterior end of said passageway;
 a relatively long and narrow tube in fluid-tight engagement with said mounting unit but movable longitudinally with respect to said mounting unit, said tube having a length sufficient to extend from said valve to the side of said mounting unit remote from said valve, said tube having means at one end thereof for securing it to said valve and having means at the other end thereof for closing said other end of said tube comprising a housing secured to said other end of said tube, said housing having a cavity in fluid communication with the interior of said tube;
 a manually operable valve on said housing in fluid communication with said cavity; and
 a rod extending through said housing and into said tube, said rod being movable lengthwise with respect to said housing and said tube and having a length sufficient to extend from said housing to at least said one end of said tube.

14. A tool for providing a connection with a valve within a gas tight enclosure, said enclosure having a through passageway which may be opened and closed, said tool comprising:
 a swivel mounting unit adapted to be secured to said enclosure at the exterior end of said passageway; and
 a relatively long and narrow tube in fluid-tight engagement with said swivel mounting unit but movable longitudinally with respect to said swivel mounting unit, said tube having a length sufficient to extend from said valve to the side of said swivel mounting unit remote from said valve, said tube having means at one end thereof for securing it to said valve and having means at the other end thereof for closing said other end of said tube, and said swivel mounting unit permitting movement of said one end of said tube transversely to the length thereof.

15. A tool as set forth in claim 14 wherein said swivel mounting unit comprises a support for receiving said tube, a ball fitting and a pair of rings for alternately clamping said ball fitting in fixed relation to said support and for permitting said ball fitting to move relative to said support.

16. A tool as set forth in claim 15 wherein said ball fitting has means for securing it to said enclosure.

17. A tool for providing a connection with a fluid controlling valve within the interior of a gas tight enclosure having a wall, said valve having a body with an outlet and having a manually operable member within the body for opening and closing the valve to thereby control the flow of fluid out of said outlet, and said valve being mounted in a fixed position within said gas tight enclosure with said body spaced from the interior surface of said wall of said gas tight enclosure, said enclosure having a through passageway in said wall which may be opened and closed, said tool comprising:
 a mounting unit adapted to be secured in fluid-tight relation to said enclosure at the exterior end of said passageway; and
 a relatively long and narrow member in fluid-tight relation with respect to said mounting unit but movable longitudinally with respect to said mounting unit, said relatively long and narrow member having one end extending from one side of said mounting unit and having a length between said one end thereof and its opposite end which is substantially greater than the length of the mounting unit longitudinally of said relatively long and narrow member and which is sufficient to extend from said outlet and said operating member of said valve to the side of said mounting unit remote from said valve and said relatively long and narrow member comprising a tube having a longitudinal fluid passageway therein extending from one end thereof to adjacent the opposite end thereof, having means at said one end of said tube for securing it to said valve and having means at the other end of said tube for closing the other end of said tube, whereby said relatively long and narrow member may be inserted into the interior of said gas tight enclosure through the passageway in the wall of the gas tight enclosure and into engagement with said valve body with said one end of said tube at said outlet and into engagement with said manually operable member of said valve to cause fluid to flow from said outlet to the exterior of said gas tight enclosure by way of the longitudinal fluid passageway in said tube; and said mounting unit having means engaging said tube and adjustable in a direction transverse to the length of said tube for moving said tube transversely to the length thereof.

18. A tool for providing a connection with a fluid controlling valve within the interior of a gas tight enclosure having a wall, said valve having a body with an outlet and having a manually operable member within the body for opening and closing the valve to thereby control the flow of fluid out of said outlet, and said valve being mounted in a fixed position within said gas tight enclosure with said body spaced from the interior surface of said wall of said gas tight enclosure, said enclosure having a through passageway in said wall which may be opened and closed, said tool comprising:

a mounting unit adapted to be secured in fluid-tight relation to said enclosure at the exterior end of said passageway; and a relatively long and narrow member in fluid-tight relation with respect to said mounting unit but movable longitudinally with respect to said mounting unit, said relatively long and narrow member having one end extending from one side of said mounting unit and having a length between said one end thereof and its opposite end which is substantially greater than the length of the mounting unit longitudinally of said relatively long and narrow member and which is sufficient to extend from said outlet and said operating member of said valve to the side of said mounting unit remote from said valve and said relatively long and narrow member having a longitudinal fluid passageway therein extending from said one end thereof to adjacent the opposite end thereof whereby said relatively long and narrow member may be inserted into the interior of said gas tight enclosure through the passageway in the wall of the gas tight enclosure and into engagement with said valve body with said one end thereof at said outlet and into engagement with said manually operable member of said valve to cause fluid to flow from said outlet to the exterior of said gas tight enclosure by way of the longitudinal fluid passageway in said relatively long and narrow member; and said mounting unit comprising a swivel unit permitting movement of said one end of said relatively long and narrow member transversely to the length of said relatively long and narrow member.

* * * * *